United States Patent

Takatori et al.

Patent Number: 5,811,068
Date of Patent: Sep. 22, 1998

[54] METHOD FOR PRODUCING OXIDE POWDER

[75] Inventors: Kazumasa Takatori; Hideo Sobukawa; Naoyoshi Watanabe, all of Aichi, Japan

[73] Assignee: Kabushiki Kaisha Toyota Chuo Kenkyusho, Aichi-ken, Japan

[21] Appl. No.: 788,693

[22] Filed: Jan. 24, 1997

[30] Foreign Application Priority Data

Jan. 25, 1996 [JP] Japan .................................. 8-011162

[51] Int. Cl.⁶ .................................................. C01F 17/00
[52] U.S. Cl. ..................... 423/263; 423/592; 423/593; 423/595; 423/598; 423/599; 423/605; 423/607; 423/610
[58] Field of Search ............... 264/12; 423/592, 423/593, 598, 606, 608, 263, 595, 599, 605, 607, 610

[56] References Cited

U.S. PATENT DOCUMENTS

| | | | |
|---|---|---|---|
| 2,823,982 | 2/1958 | Saladin et al. | 423/608 |
| 3,733,387 | 5/1973 | Kugley et al. | 423/337 |
| 3,954,945 | 5/1976 | Lange et al. | 423/608 |
| 4,023,961 | 5/1977 | Douglas et al. | 423/592 |
| 4,048,290 | 9/1977 | Lee | 423/608 |
| 4,292,290 | 9/1981 | Tunison, III | 423/592 |
| 4,610,857 | 9/1986 | Ogawa et al. | 423/335 |
| 4,649,037 | 3/1987 | Marsh et al. | 423/606 |
| 4,654,075 | 3/1987 | Cipollini | 423/598 |
| 4,713,233 | 12/1987 | Marsh et al. | 423/608 |
| 4,749,664 | 6/1988 | Ross et al. | 423/598 |
| 5,071,635 | 12/1991 | Yamanaka et al. | 423/592 |
| 5,108,732 | 4/1992 | Krumbe et al. | 423/606 |
| 5,114,702 | 5/1992 | Pederson et al. | 423/595 |
| 5,139,766 | 8/1992 | Castellano et al. | 423/608 |
| 5,358,695 | 10/1994 | Heible et al. | 423/592 |
| 5,401,441 | 3/1995 | Robert et al. | 252/518 |
| 5,650,130 | 7/1997 | Katz et al. | 423/592 |

FOREIGN PATENT DOCUMENTS

| | | |
|---|---|---|
| 1458298 | 2/1965 | France . |
| 7206207 | 2/1972 | Japan . |
| 0251106 | 12/1985 | Japan . |
| 403047528 | 2/1991 | Japan . |
| 404164822 | 6/1992 | Japan . |
| 404164823 | 6/1992 | Japan . |
| 404250842 | 9/1992 | Japan . |
| 404265150 | 9/1992 | Japan . |
| 8-73221 | 3/1996 | Japan . |

OTHER PUBLICATIONS

P. Fornasiero, et al., "Rh–loaded $CeO_2$–$ZrO_2$ Solid Solutions as Highly Efficient Oxygen Exchangers: Dependence of the Reduction Behavior and the Oxygen Storage Capacity on the Structural Properties" Journal of Catalysis, vol. 151, (1995), pp. 168–177.

Primary Examiner—Paul Marcantoni
Attorney, Agent, or Firm—Oblon, Spivak, McClelland, Maier & Neustadt, P.C.

[57] ABSTRACT

Disclosed is a method for producing oxide powders and complex oxide powders having an oxygen amount smaller than the stoichiometric amount. The method comprises: spraying a combustible liquid that contains at least one raw material of metals capable of having a plural number of valences and compounds of such metals; and firing the raw material to give a powder of an oxide of at least one of said metals. The oxygen amount in the atmosphere in which the combustible liquid containing said raw material is sprayed and fired is smaller than the total of the oxygen amount necessary for the complete combustion of said combustible liquid and the oxygen amount necessary for the conversion of said raw material into an oxide that is the most stable in air at room temperature.

20 Claims, 1 Drawing Sheet

METHOD FOR PRODUCING OXIDE POWDER

BACKGROUND OF THE INVENTION

1. Field of the Invention

The present invention relates to a method for producing powders of oxides, such as $CeO_2$—$ZrO_2$, $SnO_2$, $MnO_2$, or their compounds (compound oxides comprising plural metals such as those mentioned above) which have oxygen defects.

2. Description of the Related Art

One conventional method for producing oxide powders comprises spraying a solution or suspension of a metal salt, heating the resulting droplets to dry the metal salt, and further heating them at high temperatures to convert the metal salt into a metal oxide. This method is advantageous in that it does not require the calcination and grinding of the powders obtained. In Japanese Patent Application Laid-Open No. 2-59405, disclosed is a spray-roasting method in which sprayed droplets are heated in three different stages at a low temperature, at a middle temperature and at a high temperature to obtain a compound oxide having a uniform composition.

In Japanese Patent Application Laid-Open No. 7-81905, disclosed is a method for producing an oxide powder, which comprises spraying a suspension or emulsion as prepared by suspending or emulsifying a solution of a raw material to be converted into an oxide in a combustible liquid, while heating it in an oxidizing atmosphere, to give an oxide powder.

In J. Catalysis, 151, 168–177, 1995, it is reported that a ceria-zirconia-type oxide powder was formed through high-temperature reaction, and thereafter rapidly cooled to give a powder having lattice defects (oxygen defects). According to this method, since the powder is heated at high temperatures, the particles are aggregated to have reduced specific surface areas (from 1 to 2 $m^2/g$).

SUMMARY OF THE INVENTION

The present invention has been made in consideration of the problems in the above-mentioned prior arts, and its object is to provide oxide powders and compound oxide powders having an oxygen amount smaller than the stoichiometric amount.

Specifically, the method for producing oxide powders of the present invention comprises: spraying a combustible liquid that contains at least one raw material selected from the group consisting of metals capable of having a plural number of valences and compounds of the metals; and firing the raw material to give a powder of a metal oxide of said raw material in an atmosphere, the atmosphere having an oxygen amount smaller than a total of a first oxygen amount and a second oxygen amount, the first oxygen amount being an amount of oxygen necessary for complete combustion of said combustible liquid, the second oxygen amount being an amount of oxygen necessary for converting a metal of said raw material into a metal oxide that is the most stable in air at room temperature.

According to this method of the present invention, since the atmosphere in which the combustible liquid containing a raw material is sprayed and heated is in an oxygen-poor, reducing condition, the necessary amount of oxygen does not enter the lattices of the oxide formed. In this method, therefore, a powder of an oxide having oxygen defects can be formed with ease. Accordingly, the powder obtained does neither require any post-treatment for the formation of oxygen defects therein nor require any additional step of milling it to the fine powder. In addition, since the oxide powder can be obtained in the dry process of the present invention, it can simply be collected without any operations such as centrifuging nor drying used in the wet powder collection process.

DETAILED DESCRIPTION OF THE INVENTION

Figure 1:
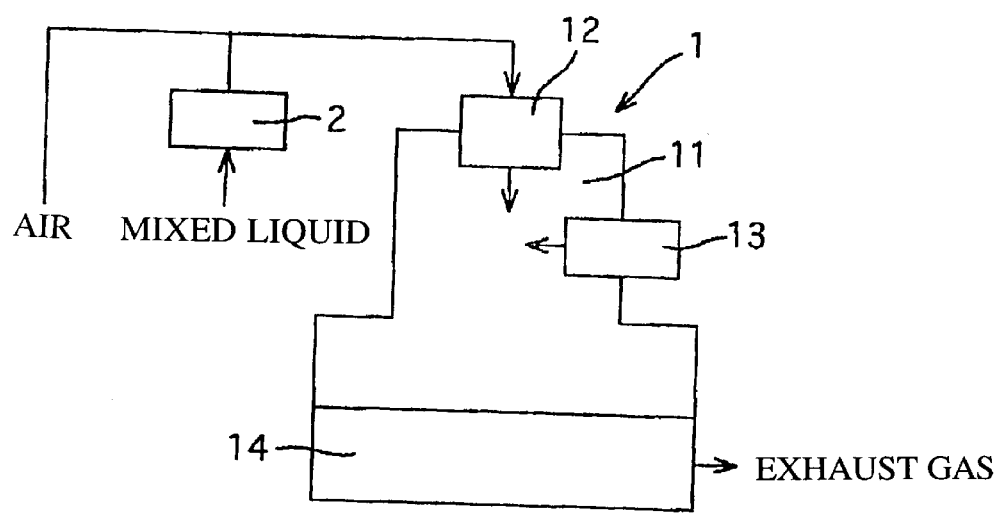
FIG. 1 is an schematic outline view showing an apparatus for producing an oxide powder as employed in the example mentioned hereinunder.

The oxide powder of the present invention can be produced from any raw material of metals capable of having a plural number of valences and compounds of such metal elements, and it includes powders of single oxides and powders of complex oxides. The metal elements to be employed in the present invention may be either of a single and the same kind or of plural different kinds. They shall form their oxides through oxidation.

Since the metals can have a plural number of valences, their oxides can usually have an oxygen amount smaller than the stoichiometric oxygen amount in those that are the most stable in air at room temperature.

At least one of the metals capable of having a plural number of valences and compounds of such metals is to be the raw material for the oxide powder of the present invention. Of these, preferred are compounds of the metal elements as being able to be handled with ease. The compounds of the metals include, for example, metal salts thereof. The metal salts include, for example, metalchlorides, metalnitrates and metalcarbonates. The raw material of at least one of the metals and compounds of the metals is used herein, after having been incorporated into a combustible liquid including organic substances. The combustible liquid thus containing the raw material may be either in dispersion or solution to be prepared by dispersing or dissolving the raw material in a combustible liquid, or even may be in mixture (mixed liquid) to be prepared by dispersing or dissolving the raw material in a liquid such as water followed by mixing the resulting dispersion or solution with a combustible liquid. The mixed liquid can be either in emulsion if the raw material is soluble in the liquid such as water, or in suspension if it is insoluble therein. one preferred embodiment of the mixed liquid is an emulsion to be prepared by adding a combustible organic substance to the aqueous solution of the raw material followed by emulsifying the resulting mixture.

One or two different compounds of the metals can be employed herein. The metals and their compounds, to be used herein are more inexpensive than those to be used in the conventional alkoxide methods.

Where the mixed liquid is in suspension, the raw material to be suspended therein may be in the form of fine particles. For this, the particles are preferably much finer, as giving much finer oxide powders. Where the mixed liquid is in emulsion, water is preferably employed as the liquid that dissolves the raw material. For this, the metal element compounds may be in aqueous solution of their chlorides or nitrates.

The combustible liquid is fired to thereby heat the raw material into its oxide. For the mixed liquid, therefore, the combustible liquid is a medium in the emulsion. The combustible liquid includes organic substance s such as kerosene, light oil and gasoline. The organic substances may be used either singly or as combined. Since the combustible organic substance is mixed, while it is liquid, with the suspension or emulsion of the mixed liquid comprising the raw material, the resulting suspension or emulsion can be homogeneous.

Where the solution comprising the raw material is mixed with the combustible liquid to prepare the mixed liquid, it is desirable to add an emulsifier thereto or to stir the mixture with a homomixer or the like. The emulsifier is preferably one containing no metal ion, and is more preferably a nonionic surfactant.

If a suitable emulsifier is used in preparing the emulsion, the emulsion prepared may comprise spherical particles having almost the same particle size. The homogeneity in the particle size of the spherical particles in the emulsion shall reflect on the particle sizes of the oxide powders to be obtained herein. It is easy to prepare emulsions comprising homogeneous spherical particles, and therefore it is easy to produce herein homogeneous oxide powders having uniform particle sizes. In addition, since the sprayed particles are not aggregated in the method of the present invention, homogeneous oxide powders having uniform particle sizes can be obtained herein.

To spray the combustible liquid containing the raw material (e.g. a mixed liquid in suspension or emulsion) into the reaction system of the present invention, the mixed liquid may be fed into an atomizer along with pressure air via a metering pump to be sprayed or atomized into a reactor. The amount of the mixed liquid to be sprayed thereinto is preferably larger as increasing the production efficiency. However, if too much amount is sprayed into the reactor, the firing temperature therein will be too high. Therefore, the uppermost limit of the amount of the liquid to be sprayed is often defined.

After having been sprayed into the reactor, the combustible liquid is heated and fired therein. To heat it, for example, employable is a method of igniting the sprayed droplets with a burner or the like, and even a method of making the sprayed droplets pass through flames or an area heated at high temperatures. As a result of this heating, the combustible liquid in the sprayed droplets is ignited and fired to give a combustion gas, which promotes the intended reaction. To retain this combustion gas, a controlled amount of oxygen is fed into the reactor.

The amount of oxygen to be in the atmosphere in which the combustible liquid is heated shall be smaller than the total of the amount of oxygen necessary for the complete combustion of the combustible liquid (first oxygen amount) and the amount of oxygen necessary for the conversion of the raw material into an oxide that is the most stable in air at room temperature (second oxygen amount). As thus defining the oxygen amount, the intended oxides with oxygen lattice defects can be formed herein for the reasons mentioned below.

In the heating atmosphere in which the combustible liquid containing the raw material is sprayed and fired, the amount of oxygen shall be controlled to be sufficient for completely firing the sprayed combustible liquid but insufficient for converting the raw material existing in said combustible liquid into an oxide which is the most stable in air at room temperature. Namely, oxygen is fed into the heating atmosphere to produce a reducing atmosphere in such a manner that the raw material is not converted therein into an oxide that is the most stable in air at room temperature.

In this connection, it is presumed that if the raw material of the metal compound mentioned hereinabove, which exists in the combustible liquid, is heated in a reducing combustible gas, the compound shall be pyrolyzed, and that, if so, the resulting pyrolysate will react with carbon dioxide or water existing around it to give carbonates or hydroxides, which will then be converted into thermally-stable oxides. In such a process, however, if the amount of oxygen in the atmosphere is controlled to be smaller than the total of the amount thereof that is necessary for completely firing the combustible liquid to give carbon dioxide and water and the amount thereof that is necessary for converting the metal element into its oxide which is the most stable in air at room temperature, the oxide formed can have oxygen lattice defects therein. Therefore, it is indispensable for forming oxides with oxygen lattice defects in the method of the present invention that the firing of the combustible liquid containing the raw material is conducted in such a reducing atmosphere.

If, on the contrary, the firing is conducted in an oxidizing atmosphere, the oxide formed is further oxidized to lose the oxygen lattice defects therein and, as a result, an oxide with no oxygen lattice defect is formed unfavorably.

The amount of oxygen to be fed into the atmosphere in which the combustible liquid containing the raw material is fired shall be less than 100%, which 100% corresponds to the total of the amount of oxygen necessary for the complete combustion of the combustible liquid to give carbon dioxide and water or steam (first oxygen amount) and the amount of oxygen necessary for the conversion of the raw material existing in the combustible liquid into an oxide that is the most stable in air at room temperature (second oxygen amount).

Preferably, the amount of oxygen is not smaller than the amount thereof necessary for the complete combustion of the combustible liquid (first oxygen amount) and is not larger than the total of the amount of oxygen necessary for the complete combustion of the combustible liquid (first oxygen amount) and 90% of the amount of oxygen necessary for conversion of the raw material existing in the combustible liquid into an oxide that is the most stable in air at room temperature (second oxygen amount), since the control of the method of the invention is easy. If the amount of oxygen falling within this range is fed into the firing atmosphere, the combustible liquid can be fired completely while ensuring the formation of the intended oxide having much more oxygen defects.

The amount of oxygen necessary for converting the raw material into an oxide that is the most stable in air at room temperature (second oxygen amount), which shall be the basis for the definition of the range of the amount of oxygen to be fed into the firing atmosphere for use in the present invention, is, if referred to, for example, for the raw material of a compound of cerium (Ce), the amount of oxygen that is necessary for converting the Ce compound into its oxide, $CeO_2$, which is the most stable in air at room temperature. If referred to for the raw material comprising a Ce compound and a compound of zirconium (Zr) to be formed into a complex oxide of Ce and Zr, the second oxygen amount is the amount of oxygen that is necessary for converting the raw material into its complex oxide, $Ce_xZr_{1-x}O_2$ (0<X<1), which is the most stable in air at room temperature.

In carrying out the present invention, a burner is preferably used for heating the reaction system to form combustion flames therein, thereby promoting the reaction, since oxygen in the system is used to form combustion flames, thereby preventing any excess presence of oxygen in the system.

The temperature in the reaction system may be from about 700° to 1000° C. or so, when measured at the side wall of the reactor. The oxide formed is rapidly cooled from the temperature at which it is formed to 200° C. at a cooling rate of 10° C./sec or higher, and thus is obtained a fine oxide powder with little aggregation.

The oxide powder thus formed is collected without being scattered. The formation of the oxide powder is accompanied by exhaust gas of steam to be formed by firing. Therefore, oxide powder may be wetted by the steam formed. To prevent this problem, it is preferable that the oxide powder is collected in the high-temperature zone, while being separated from the exhaust gas. For example, in order to collect only the powder, the product formed is passed through a punching metal or the like to make only the powder accumulated, and the thus accumulated powder is collected.

In that manner mentioned hereinabove, the oxide powder is produced. Since the method of the present invention does not comprise any conventional calcining and grinding step, the steps constituting it can be reduced and the product produced therein has few impurities.

Of the oxide powders to be produced according to the present invention, those comprising transition metals such as Ti, V, Cr and Mn and those comprising rare earth metals such as Ce and Pr can have many oxygen lattice defects.

DESCRIPTION OF PREFERRED EMBODIMENT OF THE INVENTION

Now, examples of the present invention are described hereinunder.

FIG. 1 is a schematic outline view showing the apparatus for producing oxide powders, which is employed in the examples.

This apparatus comprises a reactor 1, and a pump 2 via which a mixed liquid is fed into the reactor 1. The reactor 1 comprises a reactant passageway (firing zone) 11, an atomizer 12 through which a mixed liquid is sprayed into the reactant passageway, a burner 13 that ignites the sprayed combustible liquid, and a powder collector 14 that collects the oxide powder formed.

To the atomizer 12, fed are air and a combustible liquid via the pump 2. Through the atomizer 12, the combustible liquid is sprayed into the reactant passageway 11, while feeding air thereinto. The thus-sprayed combustible liquid is ignited by the burner 13 disposed in the reactant passageway 11, to form a combustion gas with which the raw material to be oxidized, that exists in the combustible liquid, is converted into an oxide powder. The thus-formed oxide powder is then collected in the powder collector 14 as positioned at the bottom of the reactor 1. With the formation of the oxide powder, the exhaust gas formed is discharged out of the reactor 1 through the powder collector 14.

Using the apparatus of this type, oxide powders were formed herein in the manner mentioned below.

A mixed aqueous solution as prepared by mixing an aqueous solution of zirconyl nitrate (concentration: 3 mol/liter) and an aqueous solution of cerium nitrate (concentration: 2 mol/liter) in a ratio by volume of 2:3, and kerosene containing 1% by weight of an emulsifier were stirred in a homogenizer to prepare an emulsion (ratio of kerosene/mixed aqueous solution=⅔).

This emulsion was fed into the atomizer 12 of the apparatus via the pump 2. Then, this was sprayed into the reactant passageway 11 through the atomizer 12, while feeding air thereinto. At the same time, the droplets of the sprayed emulsion and air were fired with the burner 13 at from 700° to 1000° C., while collecting the powder of solid solution of ceria and zirconia in the powder collector 14. In this process, the amount of oxygen to be in the reactant passageway 11 was controlled by controlling the amount of air to be used for spraying the emulsion, the amount of air to be used for firing the burner 13 and the amount of air or oxygen to be fed into the reactant passageway 11 through the air or oxygen-introducing inlet as provided in the reactant passageway 11. The firing temperature mentioned above was measured by monitoring the temperature of the wall of the reactant passageway, which is estimated to be lower by about a few hundred °C. than the actual temperature in the reactant passageway.

The amount of oxygen in the reactant passageway was calculated by subtracting the amount of oxygen to be consumed by the complete combustion of the combustible liquid, kerosene, from the whole amount of oxygen in the reaction system.

TABLE 1

|  |  | Amount of Oxygen | Lattice Constant (Å) |
|---|---|---|---|
| Example | No. 1 | 30 wt. % | 5.361 |
|  | No. 2 | 50 wt. % | 5.342 |
|  | No. 3 | 90 wt. % | 5.295 |
| Comparative Example |  | 100 wt. % | 5.290 |

By subtracting the amount of oxygen necessary for the complete combustion of the combustible liquid to give carbon dioxide and water, from the whole amount of oxygen to be in the reaction system, obtained was the amount of oxygen necessary for the conversion of the metals in the mixed solution into an oxide that is the most stable in air at room temperature, to be 100% by weight. Herein employed were four different oxygen levels. Precisely, in No. 1, the amount of oxygen was 30% by weight; in No. 2, 50% by weight; in No. 3, 90% by weight; and in Comparative Example, 100% by weight. The lattice constant of each of the oxide powders thus obtained herein was measured, and shown in Table 1.

As in Table 1, the data of the oxygen lattice constant in the samples of Example No. 1 to No. 3 are larger than that in the sample of Comparative Example in which the oxygen amount was 100% by weight. This means that the oxygen defects in the former enlarged the lattice constant therein.

The powders of Example No. 1 to No. 3 that had been formed in the condition where the amount of oxygen was insufficient were grayish green, and their crystal structures were of the type of fluorite structure. These verified the introduction of oxygen defects in these samples. After having absorbed the necessary amount of oxygen in heat treatment in air at 300° C., these samples came to have the lattice constant of 5.290 Å as in the sample of Comparative Example. Thus, according to the method of the present invention, obtained were powders with high activity to oxygen even in such a low temperature range of 300° C. or lower.

While the invention has been described in detail and with reference to specific embodiments thereof, it will be apparent to one skilled in the art that various changes and modifications can be made therein without departing from the spirit and scope thereof.

What is claimed is:

1. A method for producing an oxide powder having oxygen defects comprising:

spraying a combustible liquid that contains at least one raw material selected from the group consisting of multi-valence state metals and compounds of the metals; and firing the raw material to give a powder of a metal oxide of said raw material in an atmosphere, the atmosphere having an oxygen amount smaller than a total of a first oxygen amount and a second oxygen amount, the first oxygen amount being an amount of oxygen necessary for complete combustion of said combustible liquid, the second oxygen amount being an amount of oxygen necessary for converting a metal of said raw material into a metal oxide that is the most stable in air at room temperature.

2. The method for producing an oxide powder having oxygen defects as claimed in claim 1, wherein the oxygen amount is not smaller than said first oxygen amount, and is not larger than the total of said first oxygen amount and 90% of said second oxygen amount.

3. The method for producing an oxide powder having oxygen defects as claimed in claim 1, further comprising cooling said powder of the metal oxide rapidly after the firing step from the temperature of firing to 200° C. at a cooling rate of 10° C./sec or higher.

4. The method for producing an oxide powder having oxygen defects as claimed in claim 1, wherein the compounds of said metals are chlorides, nitrates and carbonates.

5. The method for producing an oxide powder having oxygen defects as claimed in claim 1, wherein said combustible liquid is at least one of kerosene, light oil and gasoline.

6. The method for producing an oxide powder having oxygen defects as claimed in claim 1, wherein the combustible liquid containing said raw material is a dispersion or solution prepared by dispersing or dissolving said raw material in a combustible liquid, or a mixed liquid prepared by dispersing or dissolving said raw material in a liquid and mixing the resulted dispersion or solution with a combustible liquid.

7. The method for producing an oxide powder as claimed in claim 6, wherein said liquid for dispersing or dissolving said raw material therein is water.

8. The method for producing an oxide powder having oxygen defects as claimed in claim 6, wherein the mixed liquid is dispersed by an emulsifier or is stirred in a homo-mixer.

9. The method for producing an oxide powder having oxygen defects as claimed in claim 8, wherein said emulsifier is a nonionic surfactant.

10. The method for producing an oxide powder having oxygen defects as claimed in claim 1, wherein the firing step is carried out by igniting sprayed droplets of the combustible liquid with a burner or by passing sprayed droplets of the combustible liquid through flames or a zone heated to high temperatures.

11. The method for producing an oxide powder having oxygen defects as claimed in claim 1, wherein the firing step is carried out by burning the combustible liquid in a reactor whose temperature ranges from 700° C. to 1000° C. at the side wall of the reactor.

12. The method for producing an oxide powder having oxygen defects as claimed in claim 1, further comprising collecting the powder of a metal oxide by separating the powder of a metal oxide from an exhaust gas.

13. The method for producing an oxide powder having oxygen defects as claimed in claim 12, wherein the collecting step is carried out by passing the powder of a metal oxide through a punching metal and accumulating the powder of a metal oxide.

14. The method for producing an oxide powder having oxygen defects as claimed in claim 1, wherein the powder of a metal oxide is an oxide of at least one of transition metals and rare earth metals.

15. The method for producing an oxide powder having oxygen defects as claimed in claim 14, wherein the powder of a metal oxide is an oxide of at least one metal selected from the group consisting of Ti, V, Cr, Mn, Ce and Pr.

16. A method for producing an oxide powder having oxygen defects, comprising:

burning a spray of a combustable liquid in an atmosphere;

wherein said combustable liquid contains at least one multi-valence state metal, said atmosphere comprising an oxygen amount smaller than a total of a first oxygen amount and a second oxygen amount, said first oxygen amount being an amount of oxygen necessary for complete combustion of said combustable liquid, and said second oxygen amount being an amount of oxygen necessary for converting said at least one multi-valence state metal into the oxide of said at least one multi-valence state metal most stable in air at room temperature.

17. The method of claim 16, wherein said oxygen amount is not smaller than said first oxygen amount, and is not larger than the total of said first oxygen amount and 90% of said second oxygen amount.

18. The method of claim 16, further comprising cooling a powder produced by said burning to a temperature of 200° C. at a cooling rate of 10° C./sec or higher.

19. The method of claim 16, wherein said combustible liquid contains at least one member selected from the group consisting of chlorides, nitrates and carbonates.

20. The method of claim 16, wherein said combustible liquid is selected from the group consisting of kerosene, light oil and gasoline.

\* \* \* \* \*